United States Patent
Zhang

(10) Patent No.: US 11,951,812 B2
(45) Date of Patent: Apr. 9, 2024

(54) SYSTEMS AND METHODS FOR AUTOMATICALLY ACTIVATING A SUNSHADE FOR A VEHICLE

(71) Applicant: GM GLOBAL TECHNOLOGY OPERATIONS LLC, Detroit, MI (US)

(72) Inventor: Yunxiu Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 17/456,717

(22) Filed: Nov. 29, 2021

(65) Prior Publication Data

US 2023/0134306 A1   May 4, 2023

(30) Foreign Application Priority Data

Oct. 29, 2021   (CN) .......................... 202111268756.0

(51) Int. Cl.
*B60J 1/20*   (2006.01)
(52) U.S. Cl.
CPC .................................. *B60J 1/2016* (2013.01)
(58) Field of Classification Search
CPC ...... B60J 1/2016; B60J 1/2019; B60J 3/0204; B60J 3/04; B60J 3/02
See application file for complete search history.

(56) References Cited

U.S. PATENT DOCUMENTS

| | | | | |
|---|---|---|---|---|
| 7,134,707 B2* | 11/2006 | Isaac | .......................... | B60J 3/04 296/97.2 |
| 9,702,183 B1* | 7/2017 | Ochiai | ..................... | B60J 3/007 |
| 2010/0094501 A1* | 4/2010 | Kwok | ........................ | B60J 3/04 359/609 |
| 2018/0111451 A1* | 4/2018 | Martens | ..................... | B60J 3/04 |
| 2020/0269663 A1 | 8/2020 | Urano et al. | | |
| 2020/0298677 A1* | 9/2020 | Katsura | ..................... | E06B 9/24 |
| 2021/0094394 A1* | 4/2021 | Costa | ..................... | B60K 35/28 |
| 2021/0158765 A1* | 5/2021 | Nishimura | ............... | B60Q 3/74 |

FOREIGN PATENT DOCUMENTS

| | | | | |
|---|---|---|---|---|
| CN | 111016594 A | * | 4/2020 | |
| CN | 108944364 B | * | 11/2020 | ............ B60J 3/0204 |
| DE | 102020125312 A1 | | 4/2021 | |

* cited by examiner

*Primary Examiner* — Abe Massad
(74) *Attorney, Agent, or Firm* — Lorenz & Kopf LLP

(57) ABSTRACT

Methods and systems for controlling a sunshade of a vehicle. The methods and systems receive a route plan from a first location to a second location, predict a sun parameter indicative of sun glare on the window for the route plan based on solar direction and vehicle heading at distributed locations throughout the route plan, and activate the sunshade based on the sun parameter so as to shade the window.

18 Claims, 4 Drawing Sheets

SYSTEMS AND METHODS FOR AUTOMATICALLY ACTIVATING A SUNSHADE FOR A VEHICLE

CROSS REFERENCE TO RELATED APPLICATIONS

This application claims the benefit of Chinese Application No. 202111268756.0, filed Oct. 29, 2021 which is herein incorporated by reference in its entirety.

TECHNICAL FIELD

The present disclosure generally relates to systems and methods associated with vehicles, and more particularly relates to systems and methods for automatically activating a sunshade.

INTRODUCTION

Vehicles are commonly equipped with fold-up or fold-back sun visors (or sunshades) that block sun light or sun rays from a top portion of the front windshield to enable drivers and front passengers to reduce glare to provide a clearer view of the road ahead. Such visors also typically pivot and can be moved to the driver side or passenger side windows to partially block the sun. These visors were primarily designed to block the sun rays that could cause problems for drivers to see the road ahead.

Existing sunshades require a vehicle occupant to position the sunshade when there is a sun glare problem. Failure to do so can be a safety issue as sun glare is known to adversely affect driving conditions. It has been found that when the sun is in a position that tends to blind drivers, traffic accidents tend to be more frequent.

Accordingly, it is desirable to reduce adverse effects of sun glare to vehicle occupants. In addition, it is desirable to facilitate shading of a window to reduce glare in a way that does not distract the vehicle occupants. Furthermore, other desirable features and characteristics of the present invention will become apparent from the subsequent detailed description of the invention and the appended claims, taken in conjunction with the accompanying drawings and the background of the invention.

SUMMARY

In one aspect, a vehicle is provided. The vehicle comprises a sunshade for a window capable of being automatically activated to shade the window and deactivated to unshade the window. The vehicle includes a processor in operable communication with the sunshade, wherein the processor is configured to execute program instructions, wherein the program instructions are configured to cause the processor to: receive a route plan from a first location to a second location, predict a sun parameter indicative of sun glare on the window for the route plan based on solar direction and vehicle heading at distributed locations throughout the route plan, and activate the sunshade based on the sun parameter.

In embodiments, activating the sunshade is based on the sun parameter exceeding a threshold. In one embodiment, the threshold is user selectable via a user interface.

In embodiments, the route plan is received from a navigation system associated with the vehicle.

In embodiments, predicting the sun parameter is further based on traffic information.

In embodiments, the program instructions are configured to cause the processor to divide the route plan into segments, predict a sun sub-parameter indicative of sun glare on the window for each segment of the route plan based on solar direction and vehicle heading and predict the sun parameter based on a combination of each sun sub-parameter. In one embodiment, the segments are defined between turns in turn by turn directions from a navigation system, between changes in speed limits, between changes in vehicle heading, between changes in road type or a combination thereof.

In embodiments, the sun parameter is a time parameter.

In embodiments, the sun parameter is an amount of time that the solar direction is aligned with a nominal occupant location and a location of the window. In other embodiments, the sun parameter is an amount of time that the solar direction faces a location of the window.

In embodiments, the sun parameter is predicted further based on solar azimuthal angle and solar zenith angle, which are included in the solar direction, a location of the window and optionally a nominal occupant position.

In embodiments, the program instructions are configured to cause the processor to receive weather information, determine whether sun glare is relevant based on the weather information, perform predicting the sun parameter if sun glare is relevant and not performing predicting the sun parameter if sun glare is not relevant.

In embodiments, the program instructions are configured to cause the processor to predict the sun parameter by: dividing the route plan into segments, calculating, for each segment, an amount of time sun is facing an occupant position based on vehicle heading, solar direction, location of the window, nominal location of an occupant, and driving time for the segment, wherein the driving time for the segment is calculated based on predicted speed and length of the segment, and totaling the amounts of time the sun is facing the occupant for each segment.

In embodiments, the sunshade is activated when the total amount of time exceeds a threshold.

In embodiments, the sunshade is activated by motorization to move the sunshade form undeployed position to a deployed position.

In embodiments, the sunshade is activated by changing a shade of glass of the window.

In embodiments, the first location is a start location and the second location is a destination location for a whole trip.

In embodiments, activating the sunshade based on the sun parameter is performed at the first location and, if the sunshade has been activated, the sunshade remains activated throughout the route plan from the first location to the second location and, if the sunshade has been deactivated at the first location, the sunshade remains deactivated throughout the route plan from the first location to the second location.

In another aspect, a method of controlling a sunshade of a vehicle, the method comprising: receiving, via a processor, a route plan from a first location to a second location, predicting, via the processor, a sun parameter indicative of sun glare on the window for the route plan based on solar direction and vehicle heading at distributed locations throughout the route plan, and activating, via the processor, the sunshade based on the sun parameter so as to shade the window.

In embodiments, predicting the sun parameter is performed by: dividing the route plan into segments, calculating, for each segment, an amount of time sun is facing an occupant position based on vehicle heading, solar direction, location of the window, nominal location of an occupant, and driving time for the segment, wherein the driving time for the segment is calculated based on predicted speed and length of the segment; and totaling the amounts of time the sun is facing the occupant for each segment.

In embodiments, the sunshade is activated when the total amount of time exceeds a threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
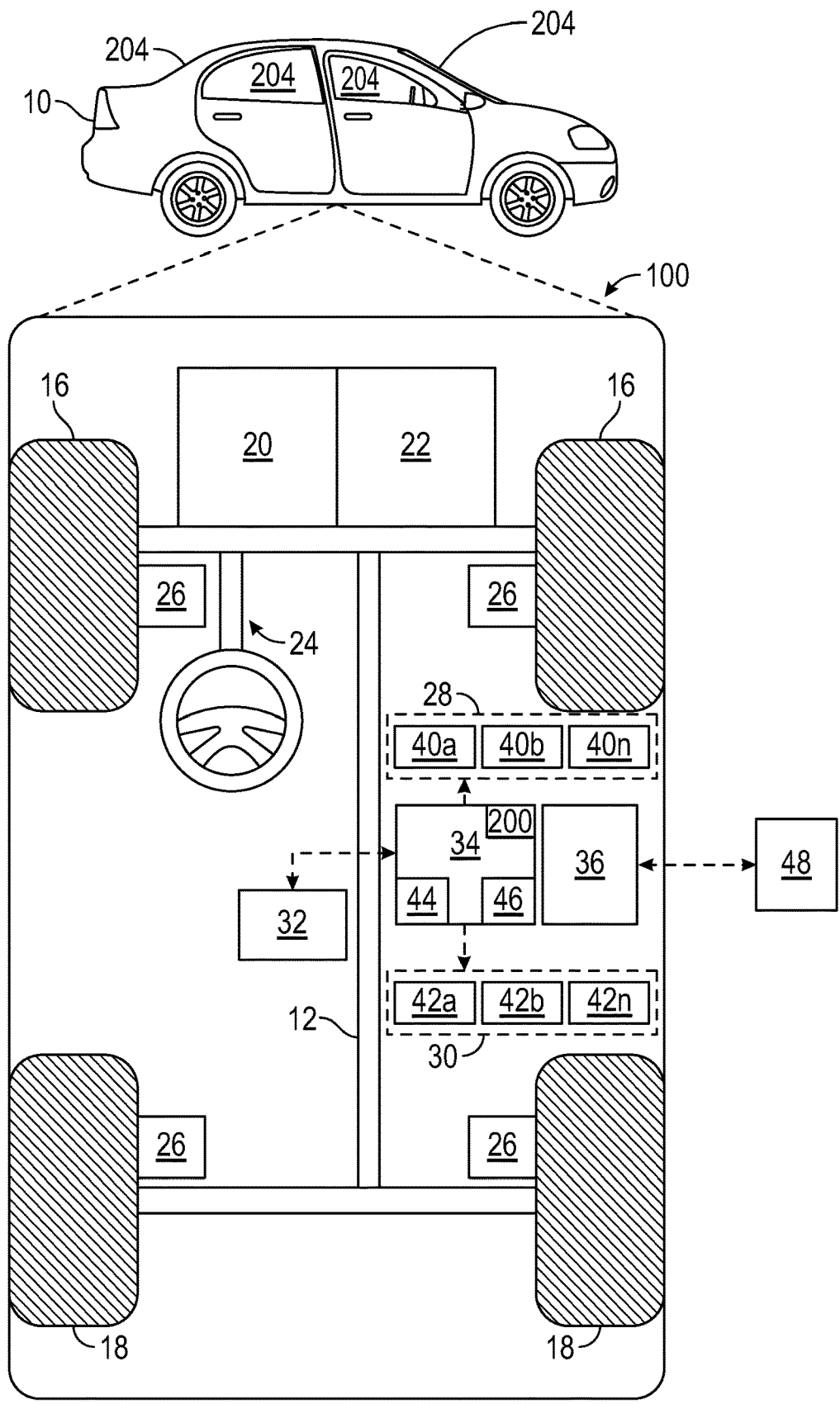
FIG. 1 is a functional block diagram illustrating a vehicle associated with a system for automatically activating a sunshade, in accordance with various embodiments.

With reference to FIG. 1, a system for automatically activating a sunshade, shown generally at 200, is associated with a vehicle 10 in accordance with various embodiments. In general, the system 200 triggers sunshades in the vehicle 10 if the time percentage that the driver/passenger is affected by sun glare during a trip goes beyond a threshold (where that threshold can be set during a pre-configuration step by a vehicle driver or passenger). That is, a vehicle system 200 is provided that includes a processor 44 configured to determine a route plan 400 and solar direction 402 (see FIG. 4) relative to a window of the vehicle 10 (e.g. a windshield, side/rear windows) during the whole journey defined by the route plan 400 based the following data items: coordinates (GPS) of the vehicle 10 along the route plan, heading of the vehicle 10 along the route plan, traffic conditions along the route plan and prevailing weather along the route plan. The processor is configured to automagically trigger a sunshade on the window (e.g. windshield, side/rear windows) if driver/passengers adjacent the window are predicted to be affected by sun glare for a preset minimum percentage of time of the journey. The preset minimum percentage may be a pre-configuration of the driver/passenger.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is any kind of road vehicle including an autonomous vehicle. The automatic sunshade activation system 200 is associated with the vehicle 10 (hereinafter referred to as the vehicle 10). The vehicle 10 may or may not be a vehicle that is automatically controlled to carry passengers from one location to another. The vehicle 10 is depicted in the illustrated embodiment as a passenger car, but it should be appreciated that any other vehicle including trucks, sport utility vehicles (SUVs), recreational vehicles (RVs), shared passenger vehicles, coaches, etc., can also be used. In an exemplary embodiment of an autonomous vehicle 10, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, in other embodiments, the vehicle 10 is of a lower level of automation and may or may not include advanced driver assistance systems (ADAS).

As shown, the vehicle 10 generally includes a propulsion system 20, a transmission system 22, a steering system 24, a brake system 26, a sensor system 28, an actuator system 30, at least one data storage device 32, at least one controller 34, and a connected system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

In the exemplary embodiment of FIG. 1, the vehicle 10 includes one or more machine activatable sunshades 204. The machine activatable sunshades 204 can be internally or externally mounted to the vehicle 10. The machine activatable sunshades 204 are associated with an electric or electromechanical device for activating (or deploying) the machine activatable sunshades. For example, the machine activatable sunshades 204 may be pivotable sunshades that is associated with a motor to run the sunshade from an undeployed position in which the window is not shaded to a deployed position when the window is shaded. In another example, the machine activatable sunshades 204 are roller based and associated with a motor to deploy the sunshade from an undeployed configuration. In yet another example, the machine activatable sunshades 204 include smart glass that transmits less sunlight when activated by a control signal. The machine activatable sunshades 204 may be associated with at least the drive side windshield and possibly both the passenger and driver side of the windshield. The machine activatable sunshades 204 may also be associated with the driver's side window. The machine activatable sunshades 204 may be associated with other windows including a roof window, front and rear passenger side windows and a rear windshield. Some or all of the windows in the vehicle 10 may be associated with machine activatable sunshades 204.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The connected system 36 is configured to wirelessly communicate information to and from other entities 48, such as but not limited to, other vehicles ("V2V" communication,) infrastructure ("V2I" communication), remote systems, and/or personal devices. In an exemplary embodiment, the connected system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in controlling the vehicle 10. In various embodiments, the data storage device 32 stores defined maps of the navigable environment. In various embodiments, the defined maps may be predefined by and obtained from a remote system (e.g. a cloud processing system). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
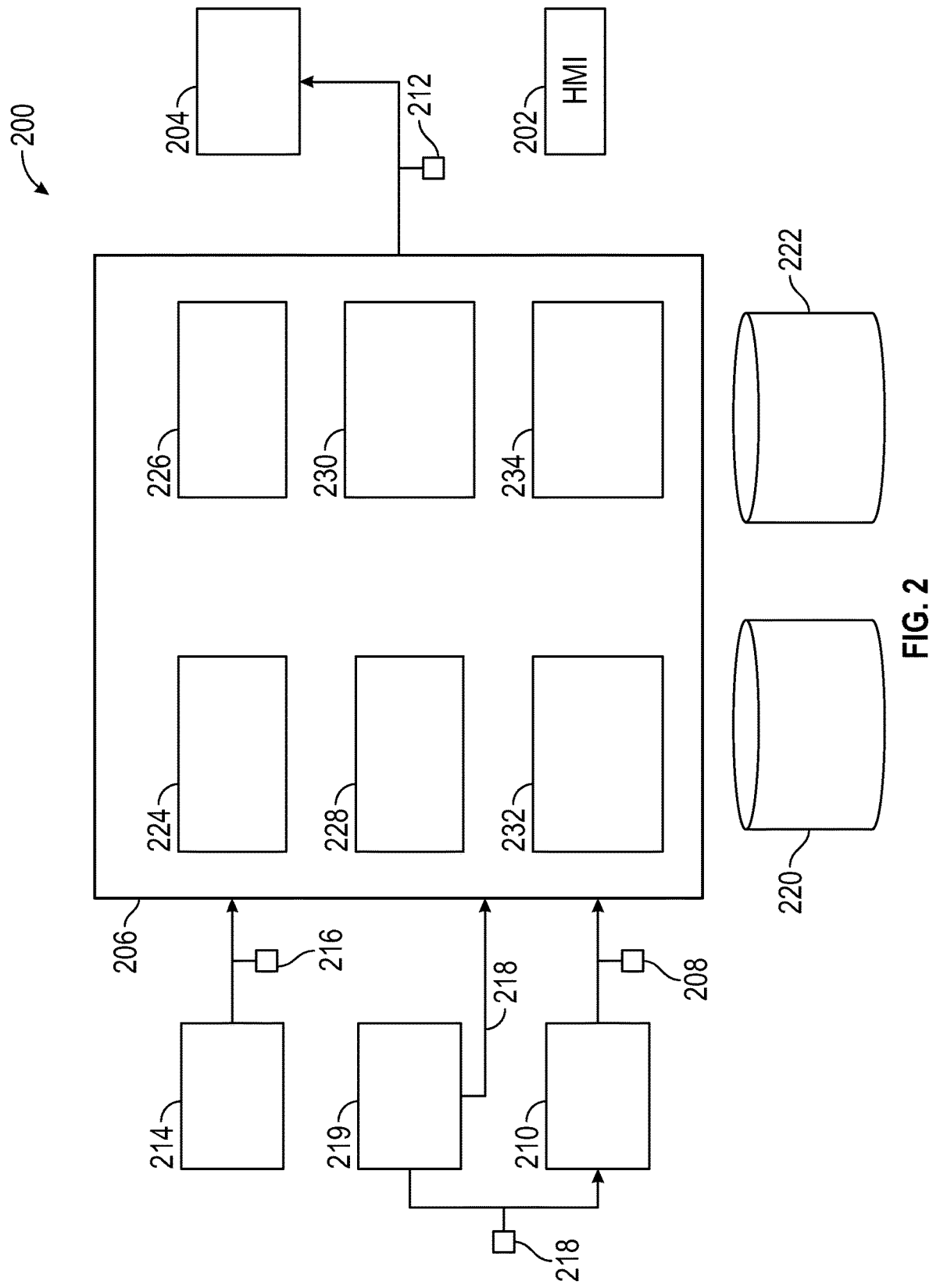
FIG. 2 is a functional block diagram of the system for automatically activating a sunshade, in accordance with various embodiments.
Figure 3:
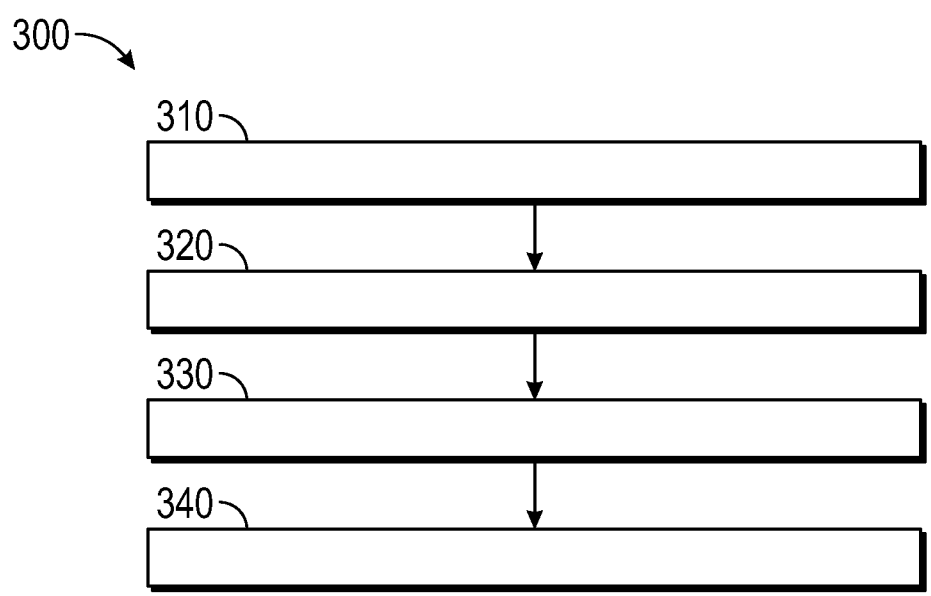
FIG. 3 is a flowchart illustrating a method of automatically activating a sunshade.

In various embodiments, one or more instructions of the controller 34 are embodied in the automatic sunshade activation system 200 and, when executed by the processor 44, perform the functions described with respect to the system of FIG. 2 and the methods described with respect to FIG. 3. In particular, and with reference to FIG. 2, the processor 44 is configured by the instructions to provide a Human-Machine Interface (HMI) 202 to a driver or passenger to set their preference of a sunshade open plan. The sunshade open plan includes percentage time thresholds for each window associated with a machine activatable sunshade 204, in one embodiment. The HMI 202 may be operably by touch screen, gesture control, voice recognition, brain control interface, etc. The HMI 202 allows the driver to set all machine activatable sunshades 204 in the vehicle 10 separately including the one on the windshield, front left window, front right window, rear left window, rear right window, back window and roof. The passenger may be able to set all of the machine activatable sunshades 204 except the one on the windshield and the one on the front left window. The type of machine activatable sunshade is not limited and could be a sun visor, a roller retractable shade, a foldable sunshade, smart glass, etc.

The instructions, when executed by the processor 44, may implement a sunshade activation module 206 that determines a time percentage of sun glare effects on each window during a trip associated with a machine activatable sunshade 204. The driver/passenger may set, via the HMI 202, a low time percentage to ensure the sunshade is deployed all of the time. e.g., about 0% if the driver/passenger does not like to be affected by the sun glare during any trip. This means that the machine activatable sunshade 204 will be activated even if there is no sun glare affects. If the driver/passenger would like to enjoy the sunshine, the threshold setting can be set to about 100%. This would mean that the machine activatable sunshades 204 of all of the windows would be deactivated even if there is predicted to be sun glare affects during a trip.

The instructions, when executed by the processor 44, cause the sunshade activation module 206 to obtain a route plan (embodied in route plan data 208) based on an occupant set destination and departure/arrival time and location before the trip. The route plan 400 (see FIG. 4) may be set through an onboard/native or external navigation system. 210. The sunshade activation module 206 checks current weather and time to determine if sunshade activation is relevant for the current trip. If it is daytime and sunny, the sunshade activation module 206 may continue with the following steps. The route plan 400 may be divided into segments A to E. The time spent on each segment A to E is calculated according to traffic data 218 representing traffic conditions. The solar direction 402 relative to the heading of the vehicle 10 and, optionally, a vision angle of a driver (or another vehicle occupant) is calculated for each road segment. From this, the time, for the whole trip, when the sun will face the driver (or another vehicle occupant) can be determined. If the percentage time of the whole tripe that the driver (or another vehicle occupant) is affected by sun glare is greater than a threshold (which may be occupant set as described above), then an activation signal 212 is sent to the machine activatable sunshade 204 to reduce or prevent the sun glare.

The automatic sunshade activation system 200 will now be described in greater detail with reference to FIG. 2, in accordance with an exemplary embodiment. The automatic sunshade activation system 200 includes the sunshade activation module 206, the one or machine activatable sunshades 204, the HMI 202, the navigation system 210 and additionally a weather data source 214, a traffic data source 219, a database of user preference profiles 220 and a database of vehicle parameters 222. The sunshade activation module 206 includes various sub-modules such as a solar direction determination sub-module 224, a sun parameter calculation sub-module 226, a vehicle heading determination sub-module 228, a sunshade activation decision sub-module 230, a segment creation sub-module 232 and a relevant weather determination sub-module 234.

In embodiments, the sunshade activation module 206 receives route plan data 208, determines a sun parameter (e.g. percentage time of trip) that is indicative of sun glare at distributed locations along the trip based on solar direction and vehicle heading at each location and with respect to each machine activatable sunshade 204. The sunshade activation module 206 issues the activation signal 212 to activate the machine activatable sunshade 204.

In more detail, the navigation system 210 receives data entry for a start location and a destination location, which may be set by a user through the HMI 202 or through another HMI of the navigation system 210. The navigation system 210 may further receive a target start or finish time for the trip. The navigation system 210 may select a current location of the vehicle 10 as a default start location, which can be obtained from a Global Positioning System (GPS) of the vehicle 10 or of the navigation system 210. The navigation system 210 may select current time as the target start time for the trip. The navigation system 210 may be provided onboard the vehicle 10 and executed by the controller 34 or may be implemented by an application on an external device such as a tablet device or a smartphone. If the navigation system 210 is not implemented by the controller 34 of the vehicle 10, the navigation system 210 communicates therewith via the connected system 36 of the vehicle 10. The navigation system 210 generates route plan data 208 describing the route plan 400 using a route planning algorithm that takes start and destination locations and the time associated with the route as inputs. The route planning algorithm may operate based on a variety of preferences such as shortest route, shortest time, avoiding certain types of roads, etc. The navigation system 210 is in communication with a traffic data source 219 such as a traffic information server. The traffic data source 219 may obtain traffic data from a variety of sources including road sensors, local departments of transportation, data collected from operators of large fleets of vehicles, other sources such as traffic helicopters and police scanners, and movement data from GPS devices on the road. The navigation system 210 factors in the traffic data 218 provided by the traffic data source 219 when providing a recommended route plan in route plan data 208. The route plan data 208 output by the navigation system 210 may include a description of each segment, defined between turn-by-turn directions, and also the amount of time the vehicle is predicted to travel along each segment. The navigation system 210 predicts the travel time for each segment based at least partly on the traffic data 218, the length of the segment and speed limits (or average speeds) along each segment.

The automatic sunshade activation system 200 includes a weather data source 214 such as a weather information server (e.g. the National Center for Environment Information) that communicates with the automatic sunshade activation system 200 via the connected system 36. The weather data source 214 provides weather data 216 to the sunshade activation module 206. The weather data 216 may particularly be indicative of cloud cover or clear sky along the route plan 400 calculated by the navigation system 210. The weather data source 214 may also provide information on solar direction, although this information can also be calculated by the sunshade activation module 206 as described further herein.

The sunshade activation module 206 includes a relevant weather determination sub-module 234 that determines whether there could potentially be a sun glare issue along the planned route based on the weather data 216. If the weather data 216 indicates that there is little or no cloud cover along the planned route, the relevant weather determination sub-module 234 outputs a flag to proceed with further sunshade activation processes. If the relevant weather determination sub-module 234 determines, based on the weather data 216, that there is sufficient cloud cover such that there will not be a sun glare problem, then then a flag is output to cease further sunshade activation processes. Similarly, the relevant weather determination sub-module 234 may determine that there will not be a sun glare problem during night time driving such that a flag is output to cease further sunshade activation processes.

The segment creation sub-module 232 is an optional functional block that divides the route plan described by the route plan data 208 into segments. In some embodiments, the route plan data 208 may already be segmented by the navigation system 210, where each segment is defined between a turn-by-turn direction. In other embodiments, the segment creation sub-module 232 may analyze the route plan data 208 to determine when the route plan involves a change in vehicle heading that is greater than a threshold, which may be 45° or more, for example. Segments may also be created based on changes in speed limits and changes in road type along the recommended route. The segment creation sub-module 232 may also parse the segments in the route plan data 208 to make sure that each segment is less than a predetermined maximum in distance or travel time and, if not, further divide the segments, thereby ensure sufficient granularity in the subsequent processes. The segment creation sub-module 232 thus outputs segmented route plan data.

The vehicle heading determination sub-module 228 determines the vehicle heading (orientation) along each segment of the recommended route defined in the route plan data 208 (or the additionally segmented version available from the segment creation sub-module 232). The vehicle heading determination sub-module 228 may provide vehicle heading in a global reference system that is consistent with the reference system used by the solar direction determination sub-module 224. The vehicle heading determination sub-module 228 may determine the heading of the vehicle on each segment using compass degrees, in solar azimuthal angle or in another common reference system. When the segment is not straight, the vehicle heading determination sub-module 228 can determine an average heading of the segment or take the vehicle heading at one discrete location along the segment (e.g. a start, middle or end of the segment). The vehicle heading determination sub-module 228 thus outputs the vehicle heading for each segment, which is provided to the sun parameter calculation sub-module 226.

The solar direction determination sub-module 224 is configured to determine the solar direction 402 (see FIG. 4) at the time of each segment. The solar direction 402 may be defined in terms of azimuth angle and elevation angle. The solar direction 402 may be looked up in a stored table based on location of the vehicle 10 at each segment, date and time of year. Alternatively, such information may be called from an external server such as the weather data source 214. Alternatively, the solar direction 402 can be calculated using known sun position equations.

The sun parameter calculation sub-module 226 receives the solar direction the vehicle heading for each segment in a common reference frame. The sun parameter calculation sub-module 226 first determines for each machine activatable sunshade 204, and for each segment, whether the solar direction and the window associated with the machine activatable sunshade 204 are aligned in the sense of the glare of the sun facing the window. One possible method is to determine a direction of facing of each window based on the vehicle heading for each segment. The direction of facing of each window can be determined using data describing the locations of the vehicle windows from the database of vehicle parameters 222. If the window locations are substantially aligned with the solar direction, then that window is affected by sun glare. In some embodiments, the data from the database of vehicle parameters 222 may include a range of elevation angles and azimuthal angles describing a direction of facing of the window that can be applied to the vehicle heading to give a range of solar directions that would be considered aligned with the window. In other embodiments, each window may be associated with a nominal vehicle occupant (e.g a driver or a passenger) having a nominal range of vision locations and angles. The sun parameter calculation sub-module 226 may determine that a sun glare issue exists for a particular segment for a particular window based on the solar direction being aligned with the nominal vehicle occupant.

The sun parameter calculation sub-module 226 may thus classify each window associated with a machine activatable sunshade 204 as having a sun glare problem based on substantial alignment of the window or nominal vehicle occupant with the solar direction. This classification is for each window and for each segment. The sun parameter calculation sub-module 226 totals the amount of time for each window that there is a sun glare problem using the travel time for each so-classified segment included in the route plan data 208. The sun parameter calculation sub-module 226 can thus provide a sun parameter that is indicative of a total amount of time for each window (associated with a machine activatable sunshade 204) along the whole trip (i.e. an accumulation of the time segments) that there is a sun glare issue relative to the total amount of time of the trip. The sun parameter may be a time percentage indicative of the amount of time that each window (or the nominal occupant) would be subject to sun glare without activation of the machine activatable sunshade 204. The sun parameter calculation sub-module 226 outputs the sun parameter to the sunshade activation decision sub-module 230 described below.

In embodiments, the sunshade activation decision sub-module 230 receives the sun parameter for each window and compares it to a corresponding threshold for the sun parameter. The same or different thresholds may be used for each window. The thresholds may be user set via the HMI 202 and stored with respect to a particular use in the database of user preference profile(s) 220. Default set thresholds (e.g. non-user adjustable thresholds) may also be used. When the threshold is exceeded, an activation signal 212 is sent to the machine activatable sunshade 204 associated with the window being assessed. When the threshold is not exceeded, there will either be an absence of an activation signal 212 or a signal requesting deactivation of the machine activatable sunshade 204.

Figure 4:
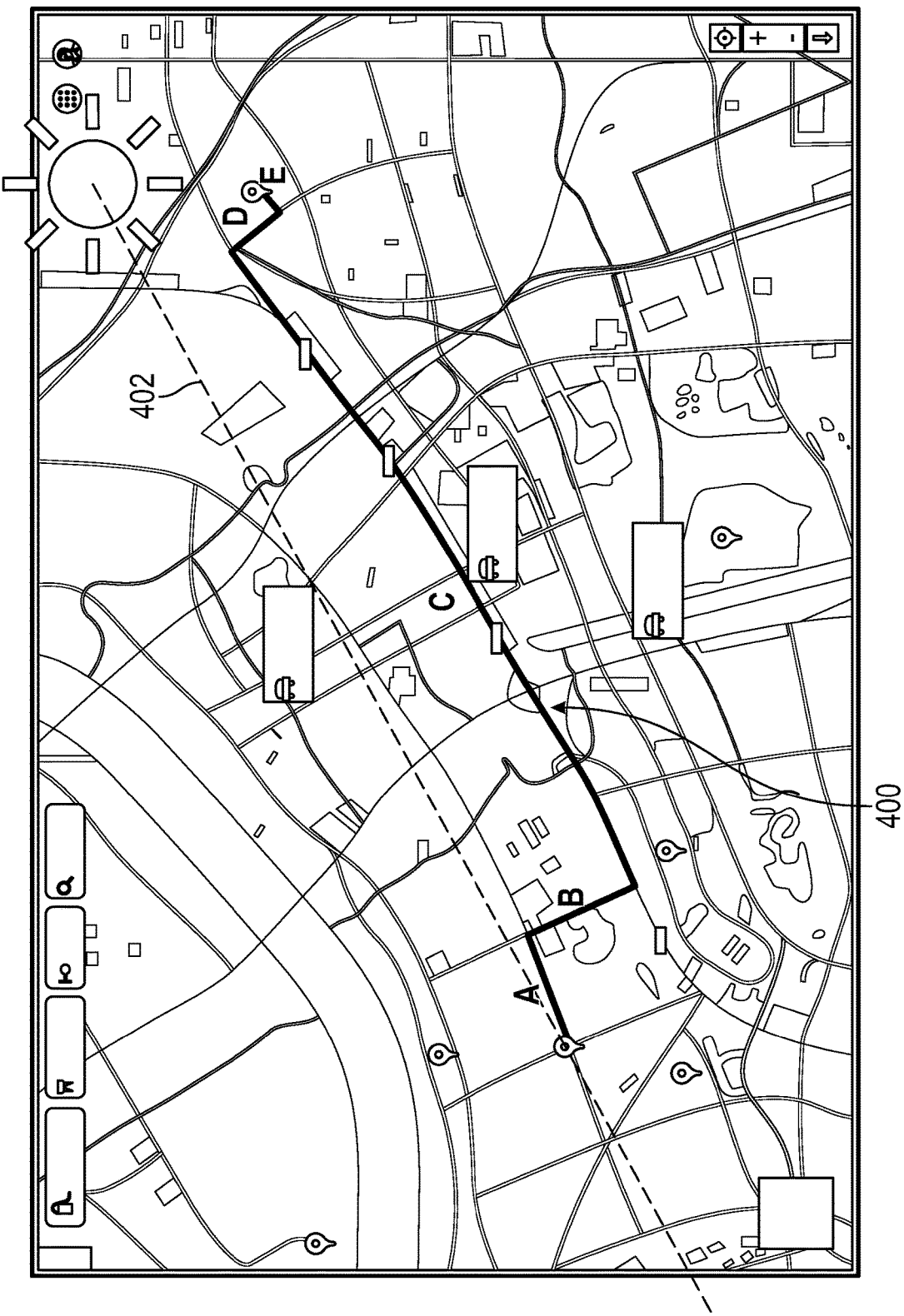
FIG. 4 is an illustration of an exemplary route plan, in accordance with various embodiments.

FIG. 4 illustrates a route plan 400 for an exemplary use case from Yuanshen Rd to General Motors campus at 8 am. The route plan 400 is divided into five road segments labelled A to E. The route plan 400 is so divided by the navigation system 210 or by the segment creation sub-module 232. Each segment A to E is defined between adjacent turn by turn driving directions. The navigation system 210 determines the total amount of time spent in traversing the route plan 400 according to the traffic data 218 on each road segment, driving speed on the road segments and length of each road segment. The solar direction determination sub-module 224, the vehicle heading determination sub-module 228 and the sun parameter calculation sub-module 226 operate together to determine the solar direction 402 relative to the vehicle heading and an occupant's nominal vision angle when the vehicle 10 would be driving on each road segment and for each window associated with the machine activatable sunshade 204. A total time when the sun will be facing the occupant can then be calculated for each window. A ratio of the total time when the sun will be facing the occupant to total time required for travelling the whole route can then be calculated by the sun parameter calculation sub-module 226 to provide a time percentage when sun glare will affect a vehicle occupant for each window.

The following Table 1 shows an exemplary user set profile included in the database of user preference profile(s) 220 that can be used as the thresholds by the sunshade activation decision sub-module 230.

TABLE 1

| Sunshade/Window | Sun glare time as a percentage of trip time |
|---|---|
| Windshield | 60% |
| Front left window | 60% |
| Front right window | 0% |
| Rear left window | 80% |
| Rear right window | 20% |
| Back window | 0% |
| Roof | 100% |

Consider an example when 63% of the total trip time, the driver will be affected by sun glare through the windshield. In this example, and based on the corresponding threshold (60%) in Table 1, the machine activatable sunshade 204 associated with at least a driver's side of the windshield is activated to provide the windshield with extra shade. The machine activatable sunshade 204 associated with the windshield is activated automatically before departure and stays activated until the vehicle 10 arrives at the destination. In some configurations of the machine activatable sunshade 204, the vehicle occupant is able to operate the sunshades manually to change the automatically set state.

Referring now to FIG. 3, and with continued reference to FIGS. 1 and 2, a flowchart illustrates a computer implemented method 300 that can be performed by the automatic sunshade activation system 200 described with respect to FIGS. 1, 2 and 4 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method 300 can be scheduled to run based on one or more predetermined events. An exemplary predetermined event can be the start of a trip or the initiation of the navigation system 210 to plan a trip.

Method 300 includes a step 310 of receiving a route plan 400. The route plan 400 can be received from the navigation system 210 and is generated based on a selected start location, destination location and time for a trip. The route plan 400 is divided into segments by the navigation system 210 and/or by the segment creation sub-module 232.

In step 320, a sun parameter is predicted that is indicative of sun glare on one or more windows of the vehicle 10 associated with a machine activatable sunshade 204. The sun parameter is determined based on solar direction and vehicle heading at various locations throughout the route plan 400. In particular, the sun parameter is determined for each segment of the route plan. The sun parameter may be determined based further on travel time on each segment and a determination of how long the sun will be facing each window during the trip by accumulating segment by segment sun glare times. The travel time may take into account traffic data 218 as well as length of each segment and likely travel speed along each segment. The sun parameter is a time percentage of total trip in some embodiments.

In step 330, the sun parameter is compared to a threshold to determine if the window (or the occupant adjacent the window) will be sufficiently affected by sun glare during the trip to support a decision to activate the machine activatable sunshade 204 associated with that window at the start of the trip. The thresholds may be set by default and may be adjustable by a vehicle occupant using the HMI 202.

In step 340, the machine activatable sunshade 204 is activated depending on the outcome of step 330. As discussed, activation can include operating a motor to deploy the machine activatable sunshade 204 or electronically controlling smart glass to darken the smart glass or to otherwise increase sun glare protection.

According to systems and methods described herein, sunshade deployment is automatically activated in a vehicle to reduce risk of accidents caused by sun glare or distraction when the driver manually operates the sunshades. Systems and methods described herein may improve a driving experience while opening/activating the sunshades when, for a significant amount of time (defined by a threshold), a window or a vehicle occupant adjacent the window is facing to the sun during a trip. In embodiments described herein, the sunshade will not be open and shut frequently as compared to a system making use of real time sun direction calculation/detection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   a sunshade for a window capable of being automatically activated to shade the window and deactivated to unshade the window;
   at least one processor in operable communication with the sunshade, wherein the at least one processor is configured to execute program instructions, wherein the program instructions are configured to cause the at least one processor to:
   receive a route plan from a first location to a second location;
   predict a sun parameter indicative of sun glare on the window for the route plan based on solar direction and vehicle heading at distributed locations throughout the route plan, wherein the program instructions are configured to cause the at least one processor to predict the sun parameter by:
   dividing the route plan into segments;
   calculating, for each segment, an amount of time sun is facing an occupant based on vehicle heading, solar direction, location of the window, nominal location of the occupant, and driving time for the segment, wherein the driving time for the segment is calculated based on predicted speed and length of the segment; and totaling the amounts of time the sun is facing the occupant for each segment; and activate the sunshade based on the sun parameter.

2. The vehicle of claim 1, wherein activating the sunshade is based on the sun parameter exceeding a threshold.

3. The vehicle of claim 2, wherein the threshold is user selectable via a user interface.

4. The vehicle of claim 1, wherein the route plan is received from a navigation system associated with the vehicle.

5. The vehicle of claim 1, wherein predicting the sun parameter is further based on traffic information.

6. The vehicle of claim 1, wherein the program instructions are configured to cause the at least one processor to divide the route plan into segments, predict a sun sub-parameter indicative of sun glare on the window for each segment of the route plan based on solar direction and vehicle heading and predict the sun parameter based on a combination of each sun sub-parameter.

7. The vehicle of claim 6, wherein the segments are defined between turns in turn by turn directions from a navigation system, between changes in speed limits, between changes in vehicle heading, between changes in road type or a combination thereof.

8. The vehicle of claim 1, wherein the sun parameter is a time parameter.

9. The vehicle of claim 1, wherein the sun parameter is an amount of time that the solar direction is aligned with a nominal occupant location and a location of the window.

10. The vehicle of claim 1, wherein the sun parameter is predicted further based on solar azimuthal angle and solar zenith angle, which are included in the solar direction, a location of the window and a nominal occupant position.

11. The vehicle of claim 1, wherein the program instructions are configured to cause the at least one processor to receive weather information, determine whether sun glare is relevant based on the weather information, perform predicting the sun parameter if sun glare is relevant and not performing predicting the sun parameter if sun glare is not relevant.

12. The vehicle of claim 1, wherein the sunshade is activated when the total amount of time exceeds a threshold.

13. The vehicle of claim 1, wherein the sunshade is activated by motorization to move the sunshade from an undeployed position to a deployed position.

14. The vehicle of claim 1, wherein the sunshade is activated by changing a shade of glass of the window.

15. The vehicle of claim 1, wherein the first location is a start location and the second location is a destination location for a whole trip.

16. The vehicle of claim 1, wherein activating the sunshade based on the sun parameter is performed at the first location and, if the sunshade has been activated, the sunshade remains activated throughout the route plan from the first location to the second location and, if the sunshade has been deactivated at the first location, the sunshade remains deactivated throughout the route plan from the first location to the second location.

17. A method of controlling a sunshade of a vehicle, the method comprising:

receiving, via at least one processor, a route plan from a first location to a second location;

predicting, via the at least one processor, a sun parameter indicative of sun glare on the window for the route plan based on solar direction and vehicle heading at distributed locations throughout the route plan, wherein predicting the sun parameter is performed by:

dividing the route plan into segments;

calculating, for each segment, an amount of time sun is facing the driver based on vehicle heading, solar direction, location of the window, nominal location of an occupant, and driving time for the segment, wherein the driving time for the segment is calculated based on predicted speed and length of the segment; and totaling the amounts of time the sun is facing the driver for each segment; and activating, via the at least one processor, the sunshade based on the sun parameter so as to shade the window.

18. The method of claim 17, wherein the sunshade is activated when the total amount of time exceeds a threshold.

* * * * *